United States Patent [19]

Buzio et al.

[11] 4,421,780
[45] Dec. 20, 1983

[54] HEAT-SEALABLE POLYOLEFIN FILMS AND PROCESSES FOR THEIR PREPARATION

[75] Inventors: Pierpaolo Buzio, Rho; Lucio Edefonti, Busto Arsizio; Gianluigi Argela', Arese, all of Italy

[73] Assignee: Societa' Italiana Resine S.I.R. S.p.A., Milan, Italy

[21] Appl. No.: 331,361

[22] Filed: Dec. 16, 1981

[30] Foreign Application Priority Data

Dec. 24, 1980 [IT]   Italy ............................... 26966 A/80

[51] Int. Cl.$^3$ ............................................. B05D 3/00
[52] U.S. Cl. ............................................. 427/40; 134/26; 134/30; 427/299; 427/301; 427/302; 427/316; 427/322; 427/354; 427/359; 427/337; 427/340; 427/407.1; 427/412.3; 427/171; 428/502; 428/505; 428/523
[58] Field of Search ..................... 428/502, 505, 393.5, 428/518, 523; 427/299, 353, 354, 322, 316, 378, 379, 407.1, 40, 412.3, 171, 340, 337, 301, 302; 134/26, 30

[56] References Cited

U.S. PATENT DOCUMENTS

| Re. 24,062 | 9/1955 | Horton | 427/354 |
|---|---|---|---|
| 2,949,383 | 8/1960 | Blake | 428/502 |
| 2,956,902 | 10/1960 | Greif | 428/518 |
| 3,250,639 | 5/1966 | Stead | 428/502 |
| 3,317,330 | 5/1967 | Livingston et al. | 427/354 |

*Primary Examiner*—George F. Lesmes
*Assistant Examiner*—E. Rollins Buffalow
*Attorney, Agent, or Firm*—Birch, Stewart, Kolasch & Birch

[57] ABSTRACT

Heat-sealable films are described which are constituted by a polyolefin film, particularly polypropylene, having on one surface thereof a layer of primer, applied in aqueous or aqueous-alcoholic solution, and chosen from: polyethylenimines, products of the condensation of urea or melamine with formaldehyde, particularly the etherified compounds; alkoxyalkyl melamine polyhydroxylates; or mixtures of the said compounds; and, on the other surface thereof, a layer of the said primer or one similar to the first, followed by a layer of vinyl, vinylidene or acrylic polymer or copolymer.

The process for the production of these films includes the surface treatment of the polyolefin film by means of an electric discharge, flame or chemical agents, followed by the application of both surfaces, by means of an aqueous or aqueous-alcoholic solution, of a layer of primer chosen from: polyethylenimines, products of the condensation of urea or melamine with formaldehyde, particularly the etherified compounds; alkoxyalkyl melamine polyhydroxylates; or mixtures of the said compounds; and finally followed by the application, to one of the surfaces thus treated, of a layer of vinyl, vinylidene or acrylic polymer or copolymer. The heat-sealable films thus obtained have improved characteristics, particularly with regard to their printability, dimensional stability and residual solvent content both in the film per se, and when printed, and are particularly suitable for use in flow packing.

22 Claims, No Drawings

HEAT-SEALABLE POLYOLEFIN FILMS AND PROCESSES FOR THEIR PREPARATION

The present invention relates to heat-sealable films comprising a polyolefin film, particularly polypropylene, usable in the packaging field. The invention also relates to the process for the production of such films.

Films made from alpha-olefin polymers, stretched in one direction or in two perpendicular directions, are known in the art. These films, and particularly polypropylene films, have a combination of physical and optical properties such as to make them particularly useful in the packaging field. However, since polyolefin films have only poor properties with regard to their heat-sealability and impermeability to gases and vapours, when these properties are desired, the films are coated or lacquered. By coating or lacquering is meant the application of at least one layer of a vinyl, vinylidene or acrylic polymer or copolymer of mixtures thereof. Thus it is possible to confer on the resulting film the property of heat-sealability in addition to improved barrier properties (impermeability to gases and vapours).

More particularly, according to the known art, a polyolefin film, particularly polypropylene, generally mono- or bi-axially drawn, is first treated superficially with an electric discharge, flame or chemical agents and then a layer of adhesion promoter (generally chosen from the polyimines) and a layer of lacquer (generally chosen from the vinyl, vinylidene or acrylic polymers or copolymers) is applied to both surfaces. Thus polyolefin films, lacquered on both surfaces, are obtained which are used particularly in:
- over-wrapping;
- form-fill sealing;
- flow-packing.

In the first two techniques mentioned both the lacquer layers are involved in the sealing while, on the other hand, in the third technique mentioned only a single layer of the lacquer participates in the sealing (longitudinal fin sealing).

Given the particular characteristics of flow packing, mono-lacquered polyolefin films, that is, films which have a layer of lacquer on only one surface with the prior interposition of a layer of adhesion promoter, are also used in this method; while the other surface has undergone only the treatment with electric discharge, flame or chemical agents.

The mono-lacquered polyolefin films known in the art have a certain number of disadvantages, the greatest of which lies in the uncertain printability, particularly because of the degradation of the effect of the surface treatment which is manifest during the lacquering phase and during the subsequent conversion phases, in addition to the natural degradation with time. Moreover, the type of ink which is suitable for printing on the treated surface is less resistant to heat than the types of ink used in printing on lacquered surfaces.

A subject of the present invention is, therefore, mono-lacquered polyolefin films which are free, or essentially free, from the disadvantages mentioned above.

Another subject of the present invention is a process for the production of the said films.

Other objects of the invention will become evident from the description which follows taken together with the experimental examples.

The mono-lacquered films of the present invention comprise a polyolefin film having, on one surface thereof, a layer of primer applied in aqueous-alcoholic solution, and chosen from: polyethylenimines; products of the condensation of urea or melamine with formaldehyde, particularly the etherified compounds; alkoxy melamine polyhydroxylates, or mixtures thereof; and having, on the other surface thereof, a layer of primer the same as or similar to the first, on which a further layer (lacquer) formed from a vinyl, vinylidene, or acrylic polymer or copolymer has been deposited.

One such film has properties, particularly with regard to the printability of its lacquer-free surface, which are generally improved compared with those of mono-lacquered films of the known art.

Furthermore, the mono-lacquered films of the present invention have better properties with regard to their residual solvent content, both in the film per se and when printed, their dimensional stability and their tendency to stick to the jaws of packaging machines during working than films of the known art which are lacquered on both surfaces.

Polyolefin films which are suitable for use in the film of the present invention are those with a thickness of from 10 to 100 microns, obtained by forming polymers or copolymers of alpha-olefins into films. The preferred films are those obtained by forming a crystalline polypropylene polymer having a melt-index of the order of 1.5 to 3 g/10' into films. The film most preferred comprises a polypropylene film having the property of crystallinity and the melt-index indicated above, which has been mono-axially or bi-axially stretched to a final thickness of the order of 20 to 35 microns.

According to the present invention such polyolefin films are subjected to a surface treatment with continuous, electric, non-perforating discharges or flame or chemical agent (generally oxidizing solutions) in order to create functional groups at the surface. The surface treatment, which is carried out on both surfaces of the polyolefin film, is generally such as to give to the treated film a wettability of the order of 38–40 dyne/cm, evaluated in accordance with the ASTM D-2578 standard.

A layer of primer is deposited on both surfaces of the treated polyolefin film, one of these layers being intended to receive a layer of lacquer subsequently, the other, however, constituting a "finished" surface of the film. Recourse must be made to specific methods for giving this latter layer properties of slip and lack of blocking in the roll.

More particularly the said primer layer, which is applied in aqueous or aqueous-alcoholic solution, is chosen from: polyethylenimines; products of the condensation of urea or melamine with formaldehyde, particularly the etherified compounds; and alkoxyalkyl melamine polyhydroxylates. The polyethylenimines are products of the polymerisation of ethylenimine having a molecular weight of the order of 10,000 to 30,000.

The products of the condensation of urea or melamine with formaldehyde are preferably those in which the methylol groups have been etherified by treatment with a lower aliphatic alcohol such as methanol, ethanol or propanol.

As stated previously, a single compound alone or a mixture of several compounds from those mentioned above may be applied as the primer. If polyethylenimine alone is used, the quantity applied per unit area of surface of the polyolefin film is critical. In particular, the quantity of polyethylenimine applied must be within the range 5 to 50 mg/m².

If a mixture of polyethylenimine and one or more of the other compounds mentioned above is used, the ratio of the polyethylenimine to the other compounds is suitably within the range 1/1 to 5/1 on a weight basis. Furthermore, the quantity of mixture applied as the primer layer to the surface of the polyolefin film may vary within the range 10 to 100 mg/m². The same range of values is adopted when only the alkoxyalkyl melamine polyhydroxylates are used as the primer. The primer layer is applied in aqueous, or generally aqueous-alcoholic, solution by the techniques known as gravure-roll, reverse-roll, kiss-roll or dip-coating, or by any other method which gives a uniform distribution of the primer layer on the polyolefin film.

After the application of the primer, the layer thus applied is dried, generally by a thermal treatment at a temperature of the order of 70°–90° C., particularly in the presence of a gaseous flow which is able to remove the vaporized solvent.

In a preferred embodiment, the primer layer is washed with water at the ambient temperature or at a temperature close to the ambient, before and/or after the drying stage. The purpose of this washing is, essentially, to remove any excess primer applied and to make the distribution on the polyolefin film more uniform. It has, indeed, been found that a uniform distribution of the primer on the polyolefin film surface, careful drying of the deposited film and the washing of this layer with water give this latter the properties of slip and lack of blocking in the roll which make the film finally obtained suitable for storage and subsequent working.

The aspects of composition, quantity applied per unit surface area and distribution on the surface, of that primer intended to receive the layer of lacquer are less critical. However, in order to simplify the operations, it is convenient to apply the two layers of primer simultaneously or consecutively, from the same aqueous or aqueous-alcoholic solution, and to dry the two layers thus applied simultaneously. Any washing with water is preferably reserved solely for the primer layer intended to form the finished surface of the film.

The lacquer, which is applied to only one surface may be constituted by polymers or copolymers of acrylic or methacrylic esters, these being understood to be the products of the polymerisation or copolymerisation of esters of acrylic or methacrylic acid with from 1–5 carbon atoms in the ester group; for example methyl, ethyl, butyl and iso-butyl esters of acrylic or methacrylic acid. In order to obtain a mono-lacquered film free, or substantially free, from blocking in the roll, polymers or copolymers of methyl methacrylate which have a $T_g$ (glass transition temperature) value not less than 80° C., a reduced viscosity at 20° C. in dilute solution within the range 18–60 dl/g, corresponding to a molecular weight of the order of 20,000 to 100,000 and an acidity number of from 0.1 to 10 expressed as mg of KOH per gram of polymer, are particularly useful.

Alternatively the lacquer may be constituted by a mixture of vinyl or vinylidene polymers or copolymers, these being understood to be the products of the polymerization or copolymerization of vinyl chloride, vinylidene chloride, acrylonitrile and vinyl acetate, with the said methacrylic ester polymers. Particularly suitable for the purpose are vinyl chloride-vinyl acetate copolymers with a vinyl chloride content of 80–90% by weight and with a viscosity in solution, expressed in terms of Fikentscher K, of not less than 38, corresponding to a molecular weight of the order of 15,000 and with a softening point not below 65° C.

The lacquers are applied in the form of a solution in an organic solvent, for example, as a 20–40% dry weight solution in aromatic hydrocarbons, or preferably in solvents of the ketone or ester type. This solution may contain other ingredients such as slip, plasticising and anti-static agents, as well as adhesion promoters for the lacquer such as: polyketone resins, epoxy resins and products of the reaction of polyepoxides with unsaturated, aliphatic, monocarboxylic acids or mono-esters of unsaturated, aliphatic dicarboxylic acids.

The application of the lacquer is usually carried out by the techniques known as gravure roll, reverse roll, kiss roll or the like, with the deposition of a quantity of lacquer of from 1–3 g/m², preferably 1.5 to 2.0 g/m², calculated in terms of the dry weight. Finally, the residual solvent is evaporated by the heating of the film to a temperature of the order of 90°–110° C., preferably in the presence of a flow of gas, for example in a tunnel with a through-flow of hot gas.

The experimental examples which follow are illustrative and non-limiting of the invention. In these examples the parts and percentages are to be understood to be by weight unless otherwise specified.

EXAMPLE 1

A bi-axially drawn, isotactic, polypropylene film is used which has a thickness of 25 microns, a longitudinal breaking load of 10 kg/m², a transverse breaking load of 25 kg/m², a longitudinal extensibility of 160% and a transverse extensibility of 40%, the determinations being carried out in accordance with the ASTM D-882 method (procedure A). The two surfaces of the polypropylene film are treated by electric discharge until the treated film has a wettability of 40 dyne/cm, on the basic of the ASTM D-2578 method. Polyethylenimine (the commercial product POLYMIN P made by the BASF company) in 0.5% aqueous-alcoholic solution is applied to the surfaces of the treated film, in quantities of 20 mg (in terms of dry weight) per m² of surface area. The application is carried out by the dip coating method. One of the two layers of the polyethylenimine applied in this manner is washed with water at the ambient temperature (about 20° C.). Drying is then carried out in a tunnel with a through-flow of air heated to 80° C.

The composition for the lacquer application is prepared to one side and consists of a solution in 2-butanone of the following constituents in the quantities indicated:

| | |
|---|---|
| Polymethyl methacrylate, with a molecular weight of 25,000 (commercial product ELVACITE 2008 made by the DU-PONT company) | 75 |
| Anchoring agent (commercial product Pacrosir SPO 183 made by Italiana Resine S.I.R.) | 15 |
| Dioctyl phosphate (commercial product SANTICIZER 141 made by the MONSANTO company) | 10 |
| Carnauba wax | 1 |
| Polyethylene wax (commercial product HIN 3 made by the SPICA company) | 0.5 |
| Sorbitan mono-stearate emulsifying agent (commercial product SPAN 60 made by the ATLAS company) | 0.5 |
| Slip agent (commercial product SYLOID 166 made by the GRACE company) | 0.1 |

The said composition is dissolved in 2-butanone to give a 25% concentration and the solution obtained is applied to the unwashed layer of primer in quantities of 1.5 g (dry weight) per m² of surface area, by the gravure roll coating method. Drying is then carried out in a tunnel with a through-flow of air at 100° C.

The film obtained has the following characteristics.

(A) LACQUER-FREE SURFACE

1. Printability: determined by the manual spreading of the commercial ink MONOCHEM made by the IN-MOMT company, drying at 100° C. for 30 seconds in an oven with a forced air circulation and subsequent test of pulling with an adhesive strip: 100% (optimum).
2. Slip: determined on the basis of the ASTM D 1894 standard: 0.8.
3. Jaw tackiness: determined by measuring the tangential force needed to detach a film test piece from a sealing bar (temperature 120° C.): null.
4. Lacquer/primer blocking: determined after 1 hour at 50° C. an at a pressure of 3 kg/cm² on the basis of the ASTM D 1146-53 standard: null.

(B) LACQUERED SURFACE

1. Weight: 1.5 g/m².
2. Transparency: (percentage): 2.3.

The transparency value (HAZE) is to be understood as the percentage ratio of the light dispersed to the light transmitted by the sample under examination under standard conditions according to ASTM D 1003-67.

3. Slip: 0.45.
4. Seal strength: determined on the basis of the ASTM D 1876-61 T standard on a test piece of with 3 cm, with sealing effected by a SENTINEL welder with a contact time of 1 second and a pressure of 3 kg/cm², at a temperature of 120° C.: 550 g/3 cm.
5. Residual solvent content: 7 mg/m².

All these characteristics are summarized in Table 1 below.

EXAMPLE 2

This is carried out in a manner similar to Example 1 with the use of the following lacquer formulation:

| | |
|---|---|
| Vinyl chloride-vinyl acetate copolymer, with a vinyl chloride content of 85% and a molecular weight of 18,000 (commercial product VINNOL E 15/45 by the WACKER CHEMIE company) | 52 |
| Polymethyl methacrylate with a molecular weight of 25,000 (commercial product ELVACITE 2008 made by the DU-PONT company) | 36 |
| Anchoring agent PACROSIR SPO 183 (commercial product made by Italiana Resine S.I.R.) | 5 |
| Acetyltributyl citrate (commercial product ATC made by AKZO CO.) | 7 |
| Polyethylene wax (commercial product HIN 3 made by the SPICA CO.) | 1 |
| Sorbitan tristearate emulsifying agent (commercial product SPAN 65 made by the ATLAS company) | 0.1 |
| Carnauba wax | 0.5 |
| Slip agent (commercial product SYLOID 166 made by the GRACE company) | 0.1 |

This composition is dissolved in 2-butanone to give a 25% concentration. A film is then obtained as in Example 1 with the characteristics given in Table 1.

EXAMPLE 3

This is carried out in a manner similar to Example 1, the polyethylenimine (commercial product POLYMIN P of the BASF company) being applied to the polypropylene film in 0.75% aqueous-alcoholic solution in quantities of 30 mg (dry weight) per m² of surface area. The application is carried out by the gravure roll method with successive passages over the two surfaces of the polypropylene film. Drying is then carried out by heat in a tunnel with a through-flow of air heated to 80° C. and one of the two layers of primer is then washed with water at the ambient temperature.

The lacquer composition is prepared to one side and consists of:

| | |
|---|---|
| A vinyl chloride-vinyl acetate copolymer with a vinyl chloride content of 87% and a molecular weight of 15,000 (commercial product VYHH made by the UNION CARBIDE company) | 42 |
| Polymethyl methacrylate with a molecular weight of 70,000 (commercial product PLEX 8664 made by the ROHM company) | 33 |
| Anchoring agent (commercial product PACROSIR SPO 183 made by Italiana Resine S.I.R.) | 20 |
| Diphenyloctyl phosphate (commercial product SANTICIZER 141 made by the MONSANTO company) | 5 |
| Polyethylene wax (commercial product HIN 3 made by the SPICA CO.) | 1 |
| Emulsifying agent (commercial product SPAN 65 made by the ATLAS company) | 1 |
| Slip agent (commercial product SYLOID 166 made by the GRACE company) | 0.15 |

The said composition is dissolved in 2-butanone to give a 25% concentration and then a film is formed as described in Example 1, the characteristics thereof being given in Table 1.

EXAMPLE 4

This is carried out in a manner similar to Example 1, the lacquer composition being as follows:

| | |
|---|---|
| Vinyl chloride-vinyl acetate copolymer, with a vinyl chloride content of 87% and a molecular weight of 20,000 (commercial product VYHH made by the UNION CARBIDE company) | 45 |
| Polymethyl methacrylate with a molecular weight of 100,000 (commercial product PARALOYD A 11 made by the ROHM AND HAAS company) | 35 |
| Anchoring agent, product of the condensation of formaldehyde with substituted cyclohexanone, with an hydroxyl number of 320 to 340 and with a softening point of 110° C. to 115° C. (commercial product KETONHARZ SK 100 made by the HULS company) | 15 |
| Acetyltributyl citrate (commercial product ATC made by the AKZO company) | 5 |
| Synthetic wax (commercial product MP 22 C made by the CHEM PLAST company) | 0.75 |
| Emulsifying agent (commercial product SPAN 65 made by the ATLAS company) | 0.75 |
| Carnauba wax | 0.5 |
| Slip agent (commercial product SYLOID 166 made by the GRACE company) | 0.15 |

This composition is dissolved in 2-butanone to give a 25% concentration.

A film is then obtained as described in Example 1, the characteristics thereof being given in Table 1.

EXAMPLE 5

A film is formed as described in Example 1 with the characteristics given in Table 1.

TABLE 1

| | LACQUER-FREE SURFACE | | | | LACQUERED SURFACE | | | | |
|---|---|---|---|---|---|---|---|---|---|
| | | | | | WEIGHT IN GRAMS ($g/m^2$) | TRANSPA-RENCY (%) | | SEAL STRENGTH (120° C.; g/3cm) | RESIDUAL SOLVENT ($mg/m^2$) |
| EX | PRINTABILITY (%) | SLIP | TACKI-NESS (120° C.) | PRIMER/LACQUER BLOCKING | | | SLIP | | |
| 1 | 100 | 0.8 | NULL | NULL | 1.5 | 2 | 0.45 | 550 | 7 |
| 2 | 100 | 0.8 | NULL | NULL | 1.5 | 2.5 | 0.30 | 700 | 5 |
| 3 | 100 | 0.85 | NULL | NULL | 1.5 | 2.3 | 0.30 | 700 | 5 |
| 4 | 100 | 0.8 | NULL | NULL | 1.5 | 2.3 | 0.30 | 650 | 5 |
| 5 | 100 | 0.85 | NULL | NULL | 1.5 | 2.3 | 0.30 | 650 | 5 |
| 6 | 100 | 0.75 | NULL | NULL | 1.5 | 2.5 | 0.30 | 700 | 5 |
| 7 | 100 | 0.75 | NULL | NULL | 1.5 | 2.3 | 0.30 | 700 | 5 |

This is carried out in a manner similar to Example 1, there being applied to the surfaces of the polypropylene film a mixture of a 1:1 ratio of polyethylenimine (commercial product POLYMIN P made by the BASF company) and the modified condensation product of melamine and formaldehyde (commercial product ACCOBOND 3900 made by the AMERICAN CYANAMID company) in 1% aqueous-alcoholic solution and in quantities of 40 mg (dry weight) per $m^2$ of surface area. The application is carried out by the dip coating method. One of the two layers of the primer is washed with water at the ambient temperature and then drying is carried out in a tunnel with a through-flow of air at 80° C.

The composition described in Example 4, dissolved in 2-butanone to give a 25% concentration, is used for the lacquering.

A film is obtained by the method described in Example 1 with the characteristics given in Table 1.

EXAMPLE 6

This is carried out in a manner similar to Example 1, there being applied to the surfaces of the polypropylene film an alkoxyalkyl melamine polyhydroxylate, the commercial product POLAQUA 103 made by the ADM company, in 1.5% aqueous-alcoholic solution, in quantities of 50 mg (dry weight) per $m^2$ of surface area.

The application is carried out by the gravure roll method with successive passages over the two surfaces of the polypropylene film.

Drying is then carried out in a tunnel with a through-flow of hot air at 80° C. and one of the treated surfaces is washed with water.

The composition given in Example 2, dissolved in 2-butanone to give a 25% concentration, is used for the lacquering.

A film is obtained as described in Example 1 with the characteristics given in Table 1.

EXAMPLE 7

This is carried out in a manner similar to Example 1, there being applied to the surfaces of the polypropylene film a modified alkoxyalkyl melamine polyhydroxylate, the commercial product AQUAFORTE made by ADM company, in 1.5% aqueous-alcoholic solution, in quantities of 50 mg (dry weight) per $m^2$ of surface area. The application is carried out by the dip coating method. Drying is then carried out in a tunnel with a through-flow of air heated to 80° C.

The composition of Example 3, dissolved in 2-butanone to give a 25% concentration, is used for lacquering.

We claim:

1. A process for preparing heat-sealable polyolefin films comprising:
    (a) treating the surfaces of a polyolefin film with an aqueous or an aqueous-alcoholic solution containing from about 0.5 to 2% by weight of a primer;
    (b) washing a first surface of said film with water at room temperature;
    (c) drying the washed film in the presence of a gaseous flow at a temperature of from about 50° to 100° C.;
    (d) treating the unwashed second surface of said film with an organic solvent solution containing from about 20 to 40% by weight of a lacquer; and
    (e) drying the film in the presence of a gaseous flow at a temperature of from about 60° to 120° C.

2. The process according to claim 1, wherein the first surface of the film is washed with water at room temperature after drying step (c) but before treatment with said lacquer.

3. The process according to claim 1, wherein said treatment step (a) creates functional groups on the surfaces of the film so that the thus treated film has a wettability of from about 38 to 40 dyne/cm, evaluated in accordance with the ASTM D-2578 standard.

4. The process according to claim 3, wherein said treatment comprises subjecting the film surfaces to continuous, electric, non-perforating discharges, or flame or chemical agents.

5. The process according to claim 1, wherein said primer is a member selected from the group consisting of polyethylenimines, condensation products of urea or melamine with formaldehyde, alkoxyalkyl melamine polyhydroxylates, and mixtures thereof.

6. The process according to claim 1, wherein said primer is a polyethylenimine applied to said film in an amount of about 5 to 50 $mg/m^2$.

7. The process according to claim 5, wherein said mixture comprises 1 to 5 parts by weight of polyethylenimines per 1 part by weight of the other components of said mixture, and is applied to said film in an amount of about 10 to 100 $mg/m^2$.

8. The process according to claim 1, wherein said lacquer comprises polymers or copolymers of acrylic or methacrylic esters.

9. The process according to claim 8, wherein said lacquer comprises polymers or copolymers of methyl methacrylate having a Tg (glass transition temperature) of not less than 80° C., a reduced viscosity of 20° C. in dilute solution of from 18 to 60 dl/g, a molecular weight of from 20,000 to 100,000 and an acidity number of from 0.1 to 10 expressed as mg of KOH per gram of polymer.

10. The process according to claim 1, wherein said lacquer comprises a mixture of vinyl or vinylidene polymers or copolymers.

11. The process according to claim 10, wherein said lacquer comprises vinyl chloride-vinyl acetate copolymers with a vinyl chloride content of 80-90% by weight, a viscosity in solution of not less than 38K (Fikentscher), a molecular weight of about 15,000 and a softening point of not below about 65° C.

12. A process for preparing heat-sealable polyolefin films comprising:
 (a) treating the surfaces of a polyolefin film with an aqueous or an aqueous-alcoholic solution containing from about 0.5 to 2% by weight of a primer;
 (b) drying the film and primer layer in the presence of a gaseous flow at a temperature of from about 50° to 100° C.;
 (c) washing a first surface of said film with water at room temperature;
 (d) treating the unwashed second surface of said film with an aqueous organic solvent solution containing from about 20 to 40% by weight of a lacquer; and
 (e) drying the film in the presence of a gaseous flow at a temperature of from about 60° to 120° C.

13. The process according to claim 12, wherein said film is washed with water at room temperature after treatment with said primer layer but before said drying step (b).

14. The process according to claim 12, wherein said treatment step (a) creates functional groups on the surfaces of the film so that the thus treated film has a wettability of from about 38 to 40 dyne/cm, evaluated in accordance with the ASTM D-2578 standard.

15. The process according to claim 14, wherein said treatment comprises subjecting the film surface to continuous, electric, non-perforating discharges, or flame or chemical agents.

16. The process according to claim 12, wherein said primer is a member selected from the group consisting of polyethylenimines, condensation products of urea or melamine with formaldehyde, alkoxyalkyl melamine polyhydroxylates, and mixtures thereof.

17. The process according to claim 12, wherein said primer is a polyethylenimine applied to said film in an amount of about 5 to 50 mg/m$^2$.

18. The process according to claim 16, wherein said mixture comprises 1 to 5 parts by weight of polyethylenimines per 1 part by weight of the other components of said mixture, and is applied to said film in an amount of about 10 to 100 mg/m$^2$.

19. The process according to claim 12, wherein said lacquer comprises polymers or copolymers of acrylic or methacrylic esters.

20. The process according to claim 19, wherein said lacquer comprises polymers of copolymers or methyl methacrylate having a Tg (glass transition temperature) of not less than 80° C., a reduced viscosity of 20° C. in dilute solution of from 18 to 60 dl/g, a molecular weight of from 20,000 to 100,000, and an acidity number of from 0.1 to 10 expressed as mg of KOH per gram of polymer.

21. The process according to claim 12, wherein said lacquer comprises vinyl chloride-vinyl acetate copolymers with a vinyl chloride content of 80-90% by weight, a viscosity in solution of not less than 38K (Fikentscher), a molecular weight of about 15,000, and a softening point of not below about 65° C.

22. The process according to claim 12, wherein said lacquer comprises a mixture of vinyl or vinylidene polymers or copolymers.

* * * * *